United States Patent [19]
Battle et al.

[11] Patent Number: 5,580,193
[45] Date of Patent: Dec. 3, 1996

[54] COOLING SYSTEM FOR TRAILER PNEUMATIC UNLOADING PROCESS

[75] Inventors: Melton R. Battle, Charenton, La.; James E. Bedeker; Robert C. Heiss, both of Ottawa, Ill.

[73] Assignee: Bulk Transportation Services, Inc., Charenton, La.

[21] Appl. No.: 534,286

[22] Filed: Sep. 27, 1995

[51] Int. Cl.⁶ .................................................. B65G 53/34
[52] U.S. Cl. .................... 406/41; 406/108; 406/119; 406/122; 406/146; 406/198; 60/407; 417/243
[58] Field of Search ............... 406/39, 41, 108, 406/118, 119, 120, 197, 198, 122, 146; 417/231, 243; 60/407

[56] References Cited

U.S. PATENT DOCUMENTS

| | | | |
|---|---|---|---|
| 4,512,687 | 4/1985 | Enns | 406/41 |
| 4,699,210 | 10/1987 | Brännström | 165/120 |
| 4,758,119 | 7/1988 | Frase et al. | 406/109 |
| 4,784,533 | 11/1988 | Teigen | 406/14 |
| 4,812,086 | 3/1989 | Kopernicky | 406/153 |
| 4,884,923 | 12/1989 | Wellink | 406/39 X |
| 5,156,498 | 10/1992 | Nomura et al. | 406/48 |
| 5,209,608 | 5/1993 | Edwards | 406/100 |
| 5,248,227 | 9/1993 | Hidock et al. | 406/41 |
| 5,284,202 | 2/1994 | Dickey et al. | 417/243 X |
| 5,354,152 | 10/1994 | Reinhardt et al. | 406/3 |

Primary Examiner—Andrew C. Pike
Attorney, Agent, or Firm—Haynes and Boone, L.L.P.

[57] ABSTRACT

Method and system unloads dry bulk materials from a tank hopper supported on a trailer, the trailer being connected to a tractor. A material conveying conduit is adapted for receiving material from the hopper. A blower is provided for supplying pressurized air to the hopper and to the conduit so that a pressure differential is created between the hopper and the conduit to thereby induce the flow of the materials from the hopper to the conduit. The pressurized air is cooled via a radiator which transfers heat from the pressurized air to ambient air. Ambient air is caused to flow across the radiator by a fan that is pneumatically driven by an air brake system located on the tractor.

21 Claims, 3 Drawing Sheets

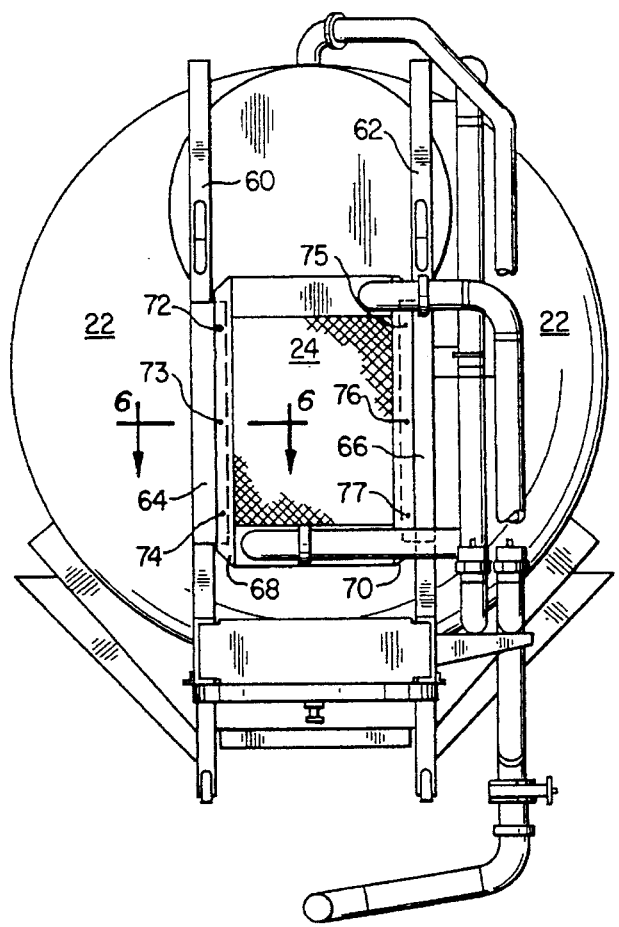
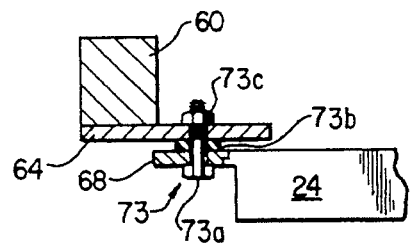
FIG. 6
FIG. 5
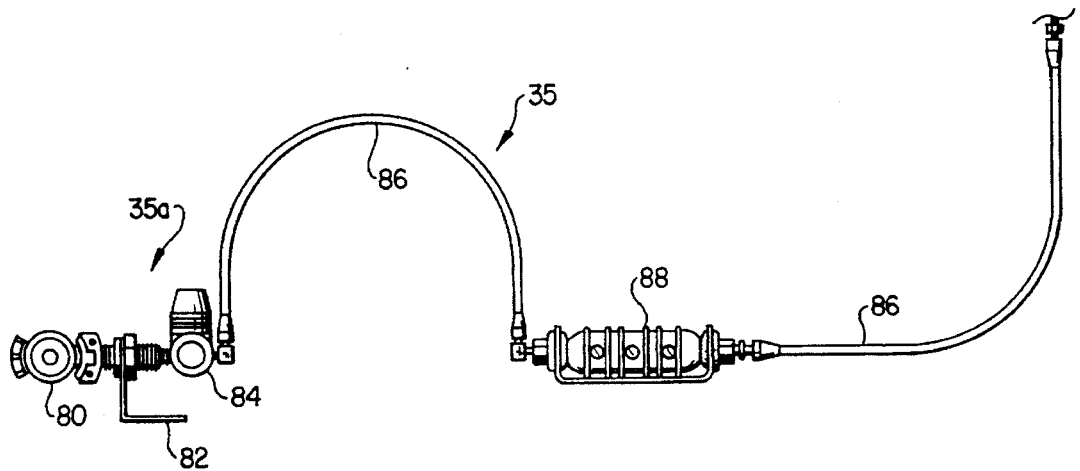
FIG. 7

COOLING SYSTEM FOR TRAILER PNEUMATIC UNLOADING PROCESS

TECHNICAL FIELD

The invention relates generally to the unloading of dry bulk materials from a transporter and, more particularly, to a method and system for cooling the air used in a pneumatic unloading process to protect temperature sensitive materials from melting.

BACKGROUND OF THE INVENTION

Many dry bulk materials are conveniently transported by truck. Typically, these trucks consist of a tractor and an attached trailer for carrying the materials. There are various types of trailers, such as a pneumatic tank trailer. Pneumatic tank trailers are often used to transport dry bulk materials like flour, sugar, plastic pellets, or the like, which can be easily stored in a pneumatic tank trailer's hopper.

The conventional method for unloading the dry bulk material from the hopper is a pneumatic unloading process. This process requires the hopper to have an outlet, usually located at the bottom of the hopper, and an inlet, usually located near the top of the hopper. A blower forces an air stream through a top air pipe and into the inlet of the hopper, thereby pressurizing the hopper interior. The blower also forces the air stream through a material conveying conduit, which has an exit port at its downstream end and is connected to the hopper outlet in the middle of the conduit. As the air stream flows through the conduit, a pressure differential occurs between the hopper and the conduit. This differential propels the dry bulk material located in the hopper to move towards the hopper outlet, into the material conveying conduit, and out the exit port.

Although the above-described method works well with many dry bulk materials, it has a drawback when working with temperature sensitive materials such as plastic pellets, sugar, or the like. Because increased pressure is directly proportional to increased temperature, as the pressure in the hopper and the material conveying conduit increases, so does the temperature. The temperature in the hopper and the material conveying conduit often rises above the melting point of the plastic pellets, thereby causing the plastic pellets to melt. Many problems are associated with melting temperature sensitive materials such as plastic pellets. For example, the composition of the pellets breaks down, rendering them useless. Also, the melting plastic can stick to the hopper, the hopper outlet, or the material conveying conduit, requiting lengthy and expensive clean up procedures.

As a result thereof, there are various methods attempting to resolve this problem. One method is to have water-enclosed sheath cool the pipe conveying the air stream to the hopper. This method, however, is not successful because water is not always available at the unloading site and discharge of the water is inconvenient and not environmentally acceptable. Another method is placing cooling fins on the material conveying conduit. This method is also unsuccessful because the fins are expensive, bulky and heavy, and are only marginally effective.

Finally, the most common method is to restrict the blowers to run at a reduced pressure, thereby keeping the temperature below the plastic pellet's melting point. Although this prevents the pellets from melting, it introduces a different set of difficulties. First of all, the pressure must be monitored to insure that it does not get too high, thereby melting the pellets. Secondly, the process now takes a longer time because the lower pressure does not move the pellets as quickly. Thirdly, the pressure differential between the hopper and the material receiving conduit is not as drastic, and therefore the pellets are more likely to get clogged in the hopper outlet.

Therefore, what is needed is a method and system to remove the dry bulk material from the hopper using a pneumatic unloading process, whereby the air temperature is kept below the dry bulk material's melting point and the air pressure is kept significantly high. Furthermore, the method and system should be self-contained on the trailer and not be overly expensive, bulky, or heavy.

SUMMARY OF THE INVENTION

The present invention, accordingly, provides a method and system for unloading dry bulk materials from a tank hopper while keeping the temperature in a cooled state and overcoming or reducing the limitations associated with prior tank cooling systems. A pneumatic process that uses a cooled air stream is used to unload the material from the hopper. In one aspect of the invention, a cooling system, attached to and supported by the trailer facilities, is placed in the air stream. The cooling system includes a heat exchanger to cool the air stream before it enters the hopper and the material conveying conduit. Furthermore, the cooling system is light, inexpensive, relatively compact, and does not require any external power or water source.

In a preferred embodiment, the heat exchanger consists of a radiator and a fan, so that the air stream is forced into the radiator, where it is cooled by the fan, and then forced through the top air pipe and the material conveying conduit. The radiator and fan are attached to the trailer's frame, and the fan is driven by compressed air coming from the tractor.

A technical advantage achieved with the present invention is that it provides cooled air to the dry bulk material in the hopper and the material conveying conduit.

A further technical advantage achieved with the present invention is that it does not require an external water, air, or electric source to cool the air, but is self-contained by facilities attached to the trailer or already existing on the tractor and trailer.

A further technical advantage achieved with the present invention is that the entire system is light, inexpensive, and does not substantially affect the size of the trailer.

BRIEF DESCRIPTION OF THE DRAWINGS

FIG. 5 is an end view of the trailer and cooling system of FIGS. 1—4.

FIG. 6 is an enlarged sectional view taken along line 6—6 of FIG. 5.

FIG. 7 is a view of a pneumatic power hose for the radiator fan of FIG. 1.

DESCRIPTION OF THE PREFERRED EMBODIMENTS

Figure 1:
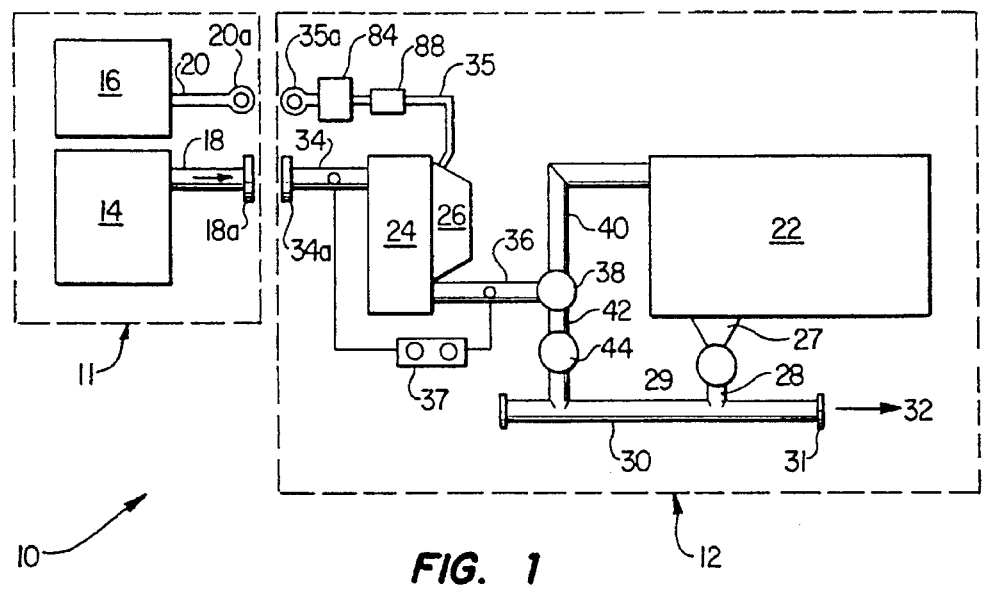
FIG. 1 is a block diagram of a tank tractor and trailer embodying features of the present invention.

FIG. 1 depicts a pneumatic unloading system 10, including a tractor 11 and a tank trailer 12. The tractor 11, which is a type well known in the highway transport industry, includes a blower 14 and a power supply, such as an air brake system 16. The blower 14 is connected to a blower pipe 18 having a coupling 18a. Likewise, the air brake system 16 is connected to a brake hose 20 having a coupling 20a. The blower 14 and air brake system 16 are thus connectable to the tank trailer 12 through coupling ends 18a and 20a, respectively.

The trailer 12 is in the form of a conventional trailer with a hopper 22, and has been modified to include a heat exchanger, such as a radiator 24 and a fan 26. Like in a conventional tank trailer, the hopper 22 is used to hold various dry bulk materials, such as plastic pellets. The hopper 22 has a lower portion that projects downward to form a hopper outlet 27. The hopper 22 is unloaded by using the hopper outlet 27 to direct the materials out of the hopper 22, through a hopper "T" 28 under the control of a valve 29 disposed in the "T", and thereby into a material conveying conduit 30. The material conveying conduit 30 then directs the materials through a discharge port 31 as shown by an arrow 32, thereby unloading the tank trailer. In the preferred embodiment, there are multiple hoppers, outlets and hopper "T"'s, as discussed in greater detail, below.

The unloading procedure is facilitated with the air stream produced by the blower 14. The blower 14 forces the air stream to the trailer 12 through the blower pipe 18. The trailer 12 includes a receiver pipe 34 having a coupling 34a which is pneumatically connected to the blower 14 by couplings 18a. The couplings 18a and 34a are conventional and will not be further discussed. The receiver pipe 34 then directs the air stream into the radiator 24, where the air is cooled.

The radiator uses the fan 26 to draw ambient air from around the trailer and draw it through, or alternatively force it through, the radiator thereby further cooling the air stream. The fan 26 is pneumatically driven, i.e., powered, through a pneumatic power hose, or connector, 35 (see also FIG. 7) having a coupling 35a. The pneumatic power hose is connected to the tractor 11 by connecting couplings 20a and 35a. In this manner, the air brake system 16 is capable of driving compressed air to the fan 26. The pneumatic power hose 35 and the coupling 35a are discussed in greater detail, below.

After passing through the radiator 24, the air stream flows through a cool air pipe 36, which includes a temperature gauge 37 to monitor the air stream temperature. The air stream then passes through a junction section 38, which splits the air stream between a top air pipe 40 and a lower air pipe 42. The top air pipe 40 directs a portion of the air stream into the hopper 22, thereby pneumatically connecting the hopper 22 to the blower 14. The lower air pipe 42 is attached to the material conveying conduit 30 through a valve 44, thereby pneumatically connecting the material conveying conduit 30 to the blower 14. By forcing a portion of the air stream into the hopper 22, the hopper 22 is thereby pressurized; by forcing a portion of the air stream through the material conveying conduit 30, a pressure differential occurs between the hopper 22 and the material conveying conduit 30. The pressure differential propels the material out of the hopper 22 and into the material conveying conduit 30, where the materials become entrained in and conveyed by the air stream. The air stream then forces the material through the material conveying conduit 30 and out the port 31, as shown by the arrow 32. The air pipes 34, 36, 40, and 42 and the radiator 24 and fan 26 are discussed in greater detail, below.

Figure 2:
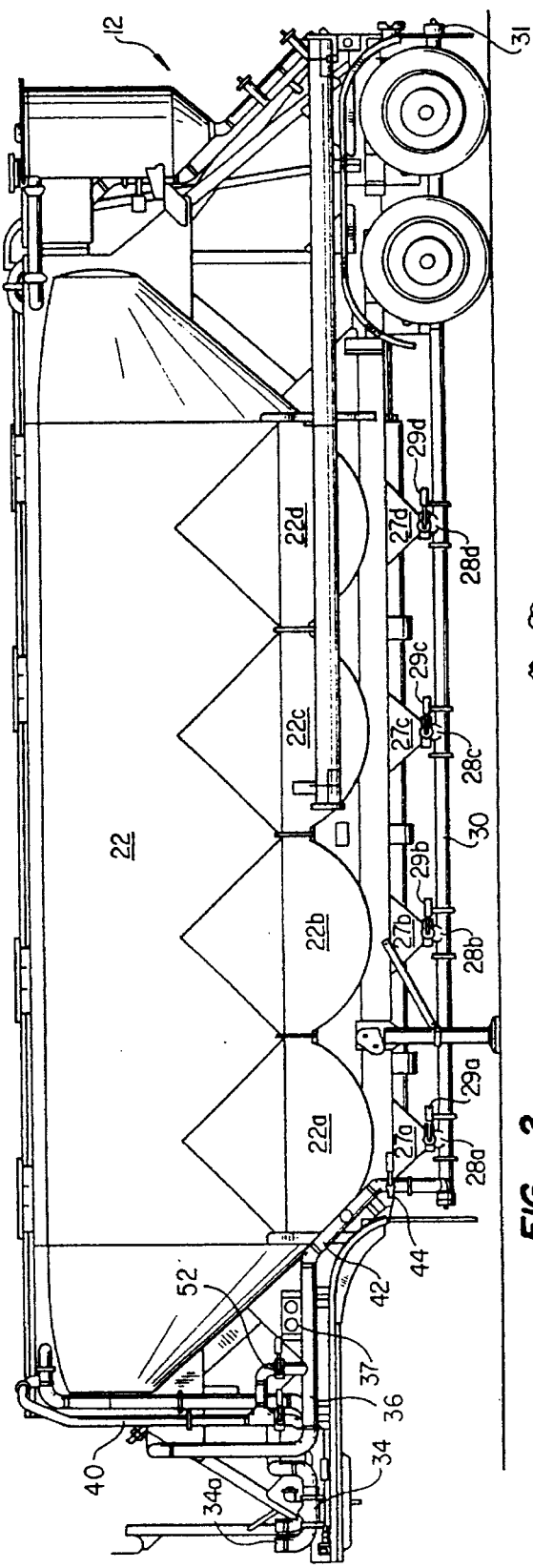
FIG. 2 is a side view of the tank trailer of FIG. 1

Referring to FIG. 2, the receiver pipe 34 directs the air stream from the blower 14 into a bottom section of the radiator 24. As the air stream moves up the radiator, the fan 26 cools the radiator by forcing ambient air through the radiator, thereby cooling the air stream. The air stream then exits an upper section of the radiator 24 through the cool air pipe 36. The air stream is directed through the junction 38, where a portion of the air stream is directed to the material conveying conduit 30 through the lower air pipe 42 and the main control valve 44. The main control valve 44 controls the air stream between the radiator 24 and the material conveying conduit 30. At the junction 38, the remaining portion of the air stream is directed to the top air pipe 40 under the control of a valve 52.

The hopper 22 of FIG. 2 is shown having a set of four hopper sections, 22a–22d, each attached to a corresponding hopper outlet, 27a–27d, hopper "T" 28a–28d, and outlet valve 29a–29d, respectively. The hopper "T"s 28a–28d are each connected to the material conveying conduit 30. Each hopper outlet 27a–27d and hopper "T" 28a–28d may be individually controlled by the associated outlet valve 29a–29d, thereby allowing an operator to select and adjust the flow of material from the hopper 22 into the material conveying conduit 30.

Figure 3:
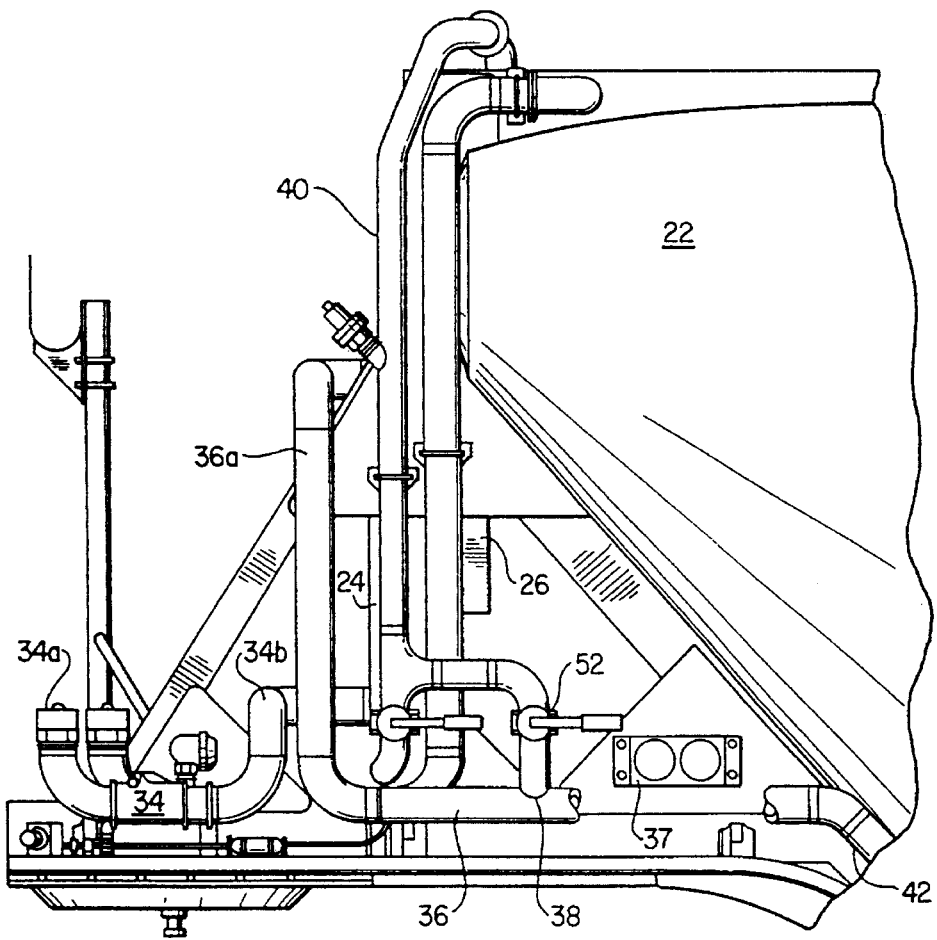
FIG. 3 is an enhanced view of the cooling system of FIGS. 1 and 2.
Figure 4:
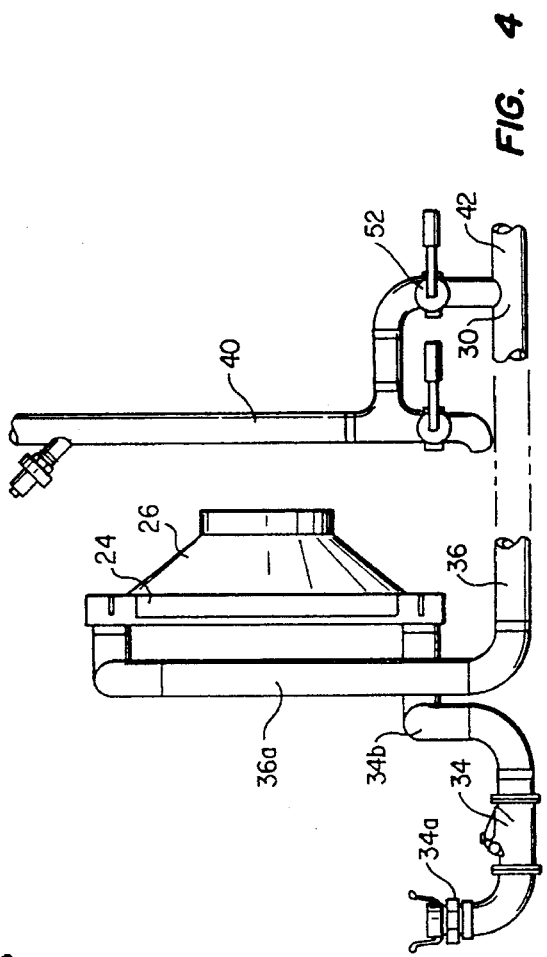
FIG. 4 is a view of a portion of the cooling system of FIG. 3.

The preferred embodiment can also be implemented as a modification kit for a conventional tank trailer, as depicted in FIGS. 3–7. Referring to FIGS. 3 and 4, the kit includes a first pipe 34b, the radiator 24, the fan 26, and a second pipe 36a. The first pipe 34b attaches the receiver pipe 34 to the radiator 24. The second pipe 36a attaches the radiator 24 to the cool air pipe 36.

The radiator 24 is attached to a conventional tank trailer as shown in FIGS. 5 and 6. The trailer 12 has two frame members, 60 and 62, used to support the hopper 22. Two elongated plate members 64 and 66 are attached to the two frame members 60 and 62, respectively, such that the plate members provide a lip for each frame member as shown in FIG. 6. The radiator 24 includes two flanges, 68 and 70, that run vertically on each side of the radiator 24. The flanges 68 and 70 are sized to overlap the plate members 64 and 66, respectively, so that the radiator 24 can thereby be attached to the frame members 60 and 62 with bolt assemblies 72–77. FIG. 6 shows the bolt assembly 73 which comprises a bolt 73a, a bushing 73b, and a nut 73c. The bolt assemblies 72 and 74–77 are similarly comprised.

Referring to FIG. 7, the kit also includes the pneumatic power hose 35 which is connected to the air brake system 16 of the tractor 11, via a power supply conductor which is selectively interchangeable with the brake hose 20. In the preferred embodiment, the coupling 35a is a glad hand connector 80 with a clamping bracket 82. The glad hand connector 80 and clamping bracket 82 are attached to a pressure gauge/regulator 84, which in turn is attached to a tubing 86. The tubing 86 runs to the fan 26 and thereby directs the compressed air to drive the fan 26. Also attached to the tubing 86 is a lubricator/filter device 88 for maintaining a pneumatic motor of the fan 26.

Although the various features and principles of the invention will be described in relation to the illustrated tractor and trailer, it will be appreciated by those skilled in the art that one or more features or principles of the invention may be used in other forms of transport and/or handling systems. It is understood that the present invention can take many forms and embodiments without departing from the spirit or the scope of the invention. For example, the tractor 11 and tank trailer 12 may be representative of a first and second section of a singular unit or vehicle used to transport dry bulk material. The system of the invention is also adaptable to railroad transport environments. It is appreciated that alternative mounting arrangements are contemplated according the particular trailer configuration. Furthermore, many non-dry bulk materials will likewise benefit from a pneumatic unloading process with the features and principles of the present invention. Accordingly, it is appropriate that the appended claims be construed broadly and in a manner consistent with the scope of the invention.

What is claimed is:

1. A system for unloading bulk material from a storage device having an outlet for said bulk material, said system comprising a material conveying conduit connected to said outlet for receiving said material and conveying said material externally of said device, means for pressurizing ambient air into pressurized air, radiator means, an air brake system, fan means connectable to and pneumatically driven by said air brake system for introducing a cooling fluid comprising air to said radiator means, means for introducing said pressurized air to said radiator means in a heat exchange relation with said cooling fluid to cool said pressurized air into cooled pressurized air, and means for passing said cooled pressurized air to said conduit to entrain said material as said material passes through said conduit.

2. The system of claim 1 wherein said cooled pressurized air propels said material through said conduit.

3. The system of claim 2 further comprising a trailer for supporting said storage device, and a tractor for supporting said air brake system, said trailer being connectable to said tractor.

4. The system of claim 1 wherein said cooled pressurized air is also introduced into said storage device to create a pressure differential across said device.

5. A method of unloading bulk material from a storage device having an outlet for said bulk material, said method comprising the steps of passing said material from said device externally of said device, pressurizing a gas into a pressurized gas, using a fan, powered by an air brake system, to move air in a heat exchange relation with said pressurized gas to cool said pressurized gas into a cooled pressurized gas, and then introducing said cooled pressurized gas to said material, during said step of passing, to cool said material.

6. The method of claim 5 wherein said step of passing comprises steps of discharging the material from the device and passing said discharged material externally of said device.

7. The method of claim 5 further comprising the step of introducing said cooled pressurized gas to said storage device to create a pressure differential.

8. The method of claim 5 wherein said step of passing further comprises passing said material from said device externally of said device into a conduit, and wherein the method further comprises introducing said cooled pressurized gas to propel said material through said conduit.

9. A system for unloading bulk material from a transport vehicle comprising:
    a hopper for containing the bulk material, said hopper having an outlet;
    a material conveying conduit connected to said hopper outlet;
    a blower, connected to said material conveying conduit, for feeding a main flow stream of a conveying gas into said material conveying conduit, whereby the bulk material moving from said hopper outlet into the material conveying conduit can become entrained in and conveyed by the main flow stream through said material conveying conduit;
    a radiator attached to said transport vehicle and connected between said blower and said material conveying conduit, whereby said main flow stream of conveying gas is cooled before it enters said material conveying conduit;
    a fan for blowing air through and cooling said radiator, said fan being attached to said transport vehicle;
    a power connector; and
    a power supply connected to said fan via said power connector for supplying said fan with power.

10. The system of claim 9, wherein the hopper further comprises an inlet, said system further comprising a pressurizing conduit connected to said inlet and said radiator whereby a portion of said main flow stream of conveying gas is used to pressurize said hopper.

11. The system of claim 9 wherein said power supply comprises an air brake system and said power connector comprises a pneumatic power hose.

12. The system of claim 11 wherein said pneumatic power hose includes a gas inlet port and means for selectively connecting said inlet port to said air brake system.

13. The system of claim 12 wherein said means for selectively connecting said inlet port to said air brake system is a glad hand connector.

14. The system of claim 13 wherein said transport vehicle is a tank trailer.

15. The system of claim 9 wherein said transport vehicle is a tank trailer.

16. A kit for cooling a transporter pneumatic unloading system, said transporter comprising a hopper for carrying dry bulk material, a material conveying conduit for feeding a conveying gas for transporting said material, and a brake system, said kit comprising:
    a heat exchanger connectable to said transporter and attached to said material conveying conduit, whereby said heat exchanger removes heat from said conveying gas; and
    a power supply conductor, connectable to said brake system, for supplying power to said heat exchanger.

17. The kit of claim 16, wherein said brake system comprises compressed air and said heat exchanger further comprises a radiator and a fan, said fan being connected to said power supply conductor and powered by said compressed air.

18. The kit of claim 17 wherein said power supply conductor is selectively interchangeable with a brake hose of said air brake system.

19. A method for unloading dry bulk material from a tank trailer connectable to a truck, said tank trailer comprising a hopper for containing the dry bulk material, a material conveying conduit, and an outlet in said hopper connected to said material conveying conduit, said truck comprising a blower for making a main flow stream of a conveying gas, said method comprising:
    feeding said main flow stream of said conveying gas into said material conveying conduit for flow across said hopper outlet, whereby the dry bulk material moving from said hopper outlet into said material conveying conduit can become entrained in and conveyed by said main flow stream; and
    cooling said main flow stream of conveying gas by using a fan, powered by an air brake system, to move ambient air through a heat exchange relation with said main flow stream of conveying gas.

20. The method of claim 19 further comprising selectively connecting a second flow stream to said air brake system.

21. The method of claim 20 wherein said selectively connecting comprises using a glad hand connector connected to a compressed air pipe to supply power to said fan.

* * * * *